(12) United States Patent
Kitai

(10) Patent No.: US 11,188,714 B2
(45) Date of Patent: Nov. 30, 2021

(54) ELECTRONIC APPARATUS, METHOD FOR CONTROLLING THE SAME, AND STORAGE MEDIUM FOR THE SAME

(71) Applicant: CANON KABUSHIKI KAISHA, Tokyo (JP)

(72) Inventor: Shimpei Kitai, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 34 days.

(21) Appl. No.: 16/541,397

(22) Filed: Aug. 15, 2019

(65) Prior Publication Data
US 2020/0089753 A1  Mar. 19, 2020

(30) Foreign Application Priority Data

Sep. 13, 2018  (JP) .............................. JP2018-171938

(51) Int. Cl.
| | |
|---|---|
| *G10L 15/02* | (2006.01) |
| *G10L 15/00* | (2013.01) |
| *G06F 40/263* | (2020.01) |
| *G06F 40/279* | (2020.01) |

(52) U.S. Cl.
CPC .......... *G06F 40/263* (2020.01); *G06F 40/279* (2020.01); *G10L 15/005* (2013.01); *G10L 15/02* (2013.01)

(58) Field of Classification Search
CPC ...... G06F 40/263; G06F 40/279; G06F 9/454; G10L 15/02; G10L 15/005; G10L 15/22; H04M 1/72403; H04M 2250/58; H04M 1/72448

USPC ............................................................ 704/8
See application file for complete search history.

(56) References Cited

U.S. PATENT DOCUMENTS

| | | | |
|---|---|---|---|
| 2005/0187758 A1 | 8/2005 | Khasin | |
| 2009/0204387 A1* | 8/2009 | Okada | ..................... G06F 40/58 |
| | | | 704/3 |

FOREIGN PATENT DOCUMENTS

| | | |
|---|---|---|
| EP | 2821991 A1 | 1/2015 |
| EP | 3007059 A1 | 4/2016 |
| JP | 2006-65528 A | 3/2006 |
| WO | 2019/084890 A1 | 5/2019 |

* cited by examiner

*Primary Examiner* — Thierry L Pham
(74) *Attorney, Agent, or Firm* — Canon U.S.A., Inc. IP Division

(57) ABSTRACT

An electronic apparatus includes a voice receiving unit, a display unit, and a control unit. The control unit is configured to perform control so as to identify the language of a voice input received by the voice receiving unit. In a case where it is determined the identified language, which is a first language, is different from a second language set as a primary language in the electronic apparatus, the control unit is configured to display on the display unit, a message for confirming whether to change the primary language from the second language to the first language in both the first language and the second language.

16 Claims, 11 Drawing Sheets

ELECTRONIC APPARATUS, METHOD FOR CONTROLLING THE SAME, AND STORAGE MEDIUM FOR THE SAME

BACKGROUND

Field

The present disclosure relates to an electronic apparatus that receives a voice input (voice).

Description of the Related Art

In recent years, electronic apparatuses capable of recognizing a received voice have become known. Further, users can set an arbitrary language from among various languages when using such electronic apparatuses. As an example of using voice for setting the language on the electronic apparatuses, Japanese Patent Application Laid-Open No. 2006-65528 discusses an electronic apparatus that, when a voice is received in a language different from the language to which the electronic apparatus is set, changes the setting to the language of the received voice.

However, Japanese Patent Application Laid-Open No. 2006-65528 involves a problem that, when the language of the user's voice is incorrectly recognized, the electronic apparatus undesirably changes the setting to this incorrectly recognized language, thereby inconveniently changing the setting to a language that was not intended by the user.

SUMMARY

According to an aspect of the present disclosure, an electronic apparatus includes a voice receiving unit, a display unit, and a control unit. The control unit is configured to perform control so as to identify the language of a voice input received by the voice receiving unit. In a case where it is determined that the identified language, which is a first language, is different from a second language set as a primary language in the electronic apparatus, the control unit is configured to display on the display unit, in both the first language and the second language, a message for confirming whether to change the primary language from the second language to the first language.

Further features will become apparent from the following description of exemplary embodiments with reference to the attached drawings. Each of the embodiments of the present invention described below can be implemented solely or as a combination of a plurality of the embodiments. Also, features from different embodiments can be combined where necessary or where the combination of elements or features from individual embodiments in a single embodiment is beneficial.

DESCRIPTION OF THE EMBODIMENTS

In the following description, an operation of each of exemplary embodiments of the present disclosure will be described with reference to the drawings. In the exemplary embodiments, a language set to an electronic apparatus as a language used by a user will be referred to as a primary language distinguishably from other languages.

Figure 1:
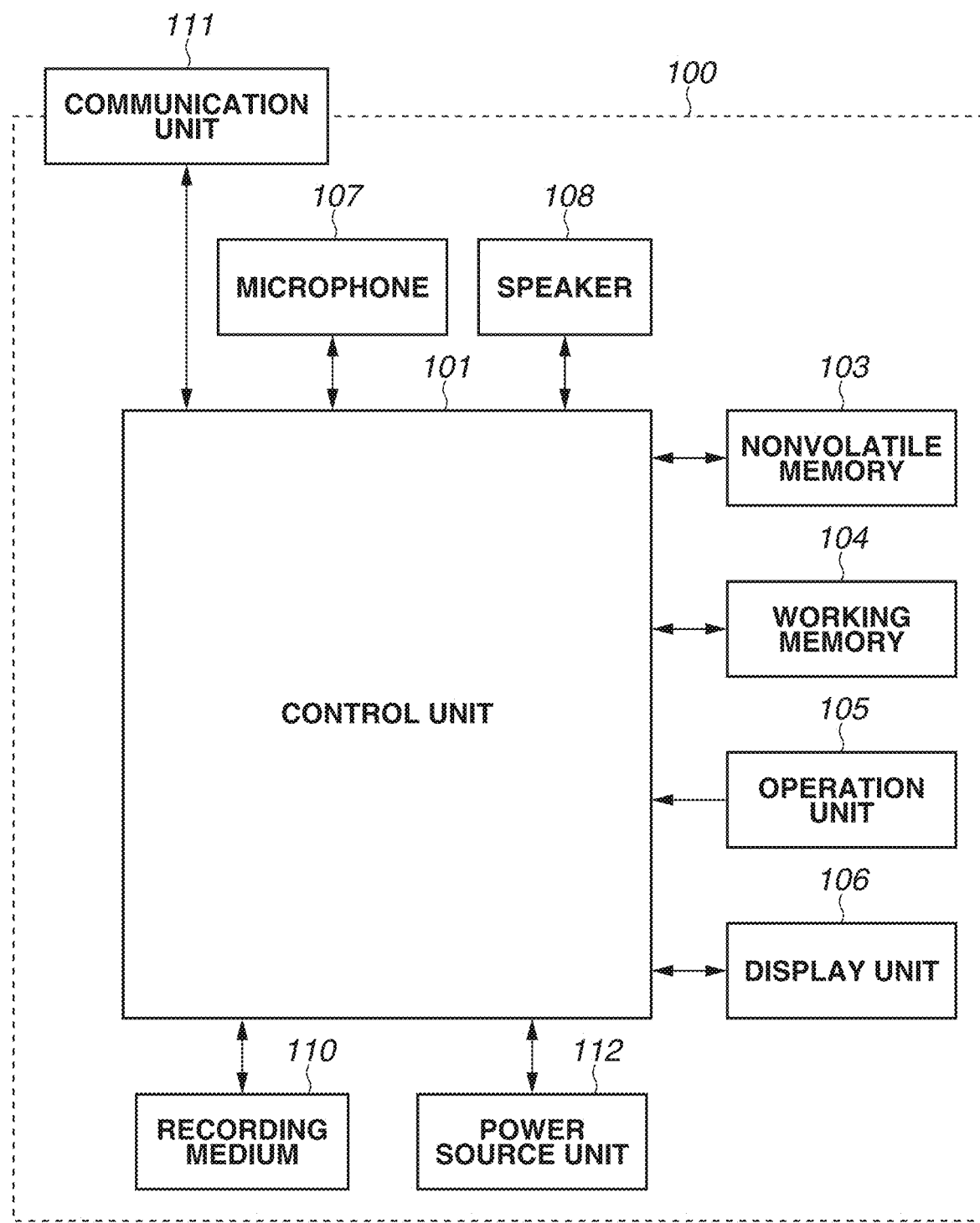
FIG. 1 is a block diagram illustrating one example of a smartphone according to a first exemplary embodiment.

In the following description, a first exemplary embodiment will be described. FIG. 1 is a block diagram illustrating an example of a configuration of a smartphone 100, which is one example of an electronic apparatus according to the present exemplary embodiment.

A control unit 101 controls each unit of the smartphone 100 according to an input signal and a program that will be described below. Instead of the control unit 101 controlling the entire apparatus, a plurality of hardware devices may control the entire apparatus by dividing the processing among them.

A nonvolatile memory 103 is an electrically erasable and recordable nonvolatile memory. The nonvolatile memory 103 records therein an operating system (OS), which is basic software executed by the control unit 101, and applications that realize advanced functions in cooperation with this OS. These applications include a program for identifying a language of received voice data and a program for performing processing according to various kinds of flowcharts that will be described below.

A working memory 104 is used as a memory for displaying an image on a display unit 106, which will be described below, a working area of the control unit 101, and the like. The working memory 104 stores therein voice data required to identify a language of voice received by a microphone 107 and voice data received via a communication unit 111.

An operation unit 105 is used to receive an instruction directed to the smartphone 100 from the user. The operation unit 105 includes, for example, an operation member such as a power button used for the user to instruct the smartphone 100 to power on/off the smartphone 100, and a touch panel provided on the display unit 106. The control unit 101 detects that the operation unit 105 is operated by the user, and performs processing according to this operation.

The display unit 106, for example, displays image data and displays characters for an interactive operation. However, the display unit 106 does not necessarily have to be provided in the smartphone 100. The display unit 106 may be provided in any manner as long as the smartphone 100 can be connected to the display unit 106 and has at least a display control function of controlling the display on the display unit 106. In the present exemplary embodiment, a liquid crystal display is used as the display unit 106. However, the display unit 106 is not limited to the liquid crystal display, and another method, such as an organic electroluminescence (EL) display, may be used.

The microphone 107 is used to receive voice. The microphone 107 receives voice from outside and outputs the received voice to the control unit 101. The control unit 101 performs processing for carrying out an analog (A)/digital (D) conversion on the received voice from analog data to digital data. Alternatively, the microphone 107 may perform the processing for carrying out the A/D conversion and output the digital data converted by the A/D conversion to the control unit 101. The microphone 107 is built in the smartphone 100, but instead, the smartphone 100 may be configured to be connected to an external microphone via a cable or the like.

A speaker 108 is used to play back the voice. The control unit 101 performs processing for carrying out a D/A conversion on the voice to be played back by the speaker 108 from the digital data to analog data, and outputs the analog data to the microphone 107. Alternatively, the speaker 108 may perform the processing for carrying out the D/A conversion instead of the control unit 101. The speaker 108 is built in the smartphone 100, but instead, the smartphone 100 may be configured to be connected to an external speaker via a cable or the like.

A recording medium 110 may be configured to be attachable to and detachable from the smartphone 100, or may be built in the smartphone 100. The recording medium 110 may be provided in any manner as long as the smartphone 100 has at least access to the recording medium 110.

The communication unit 111 is an interface for connecting to an external apparatus. The smartphone 100 according to the present exemplary embodiment can transmit and receive data to and from the external apparatus via the communication unit 111. For example, the smartphone 100 can transmit the voice data received by the microphone 107 to the external apparatus via the communication unit 111. Further, the smartphone 100 can receive the voice data from the external apparatus. In the present exemplary embodiment, the communication unit 111 includes an interface for communicating with the external apparatus via a wireless local area network (LAN) in conformity with the Institute of Electrical and Electronics Engineers (IEEE) 802.11 standards. The control unit 101 realizes wireless communication with the external apparatus by controlling the communication unit 111. The communication method is not limited to the wireless communication method like the wireless LAN, and may be a wired communication method. Although the communication unit 111 is built in the smartphone 100, the smartphone 100 may be configured to be connected to an external communication module via a LAN cable.

A power source unit 112 includes a primary battery, such as an alkaline battery and a lithium battery, a secondary battery, such as a nickel-cadmium (NiCd) battery, a nickel metal hydride (NiMH) battery, and a lithium (Li) battery, an alternating-current (AC) adapter, and the like.

Figure 2:
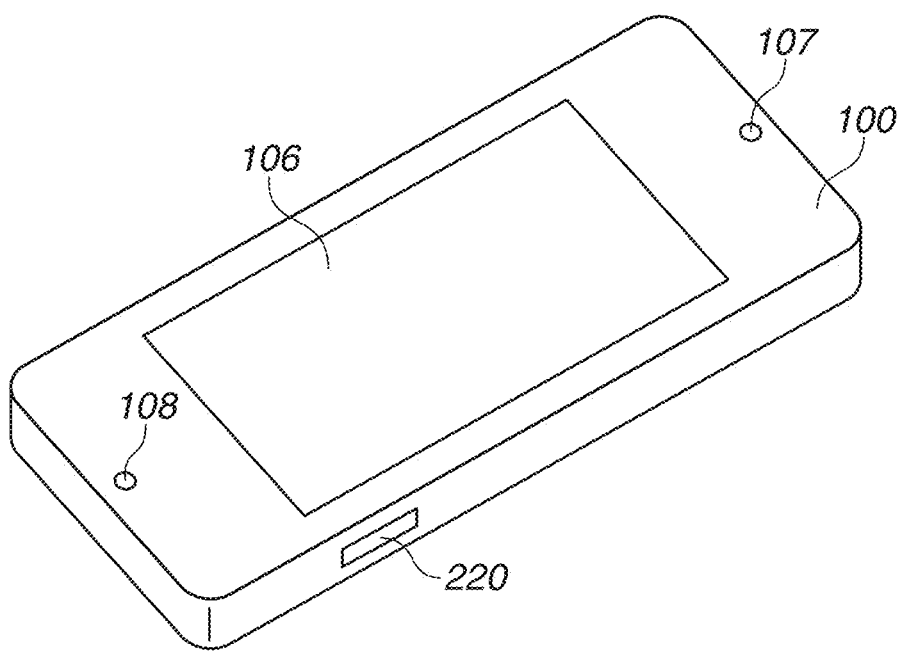
FIG. 2 illustrates an outer appearance of the one example of the smartphone according to the first exemplary embodiment.
Figure 3:
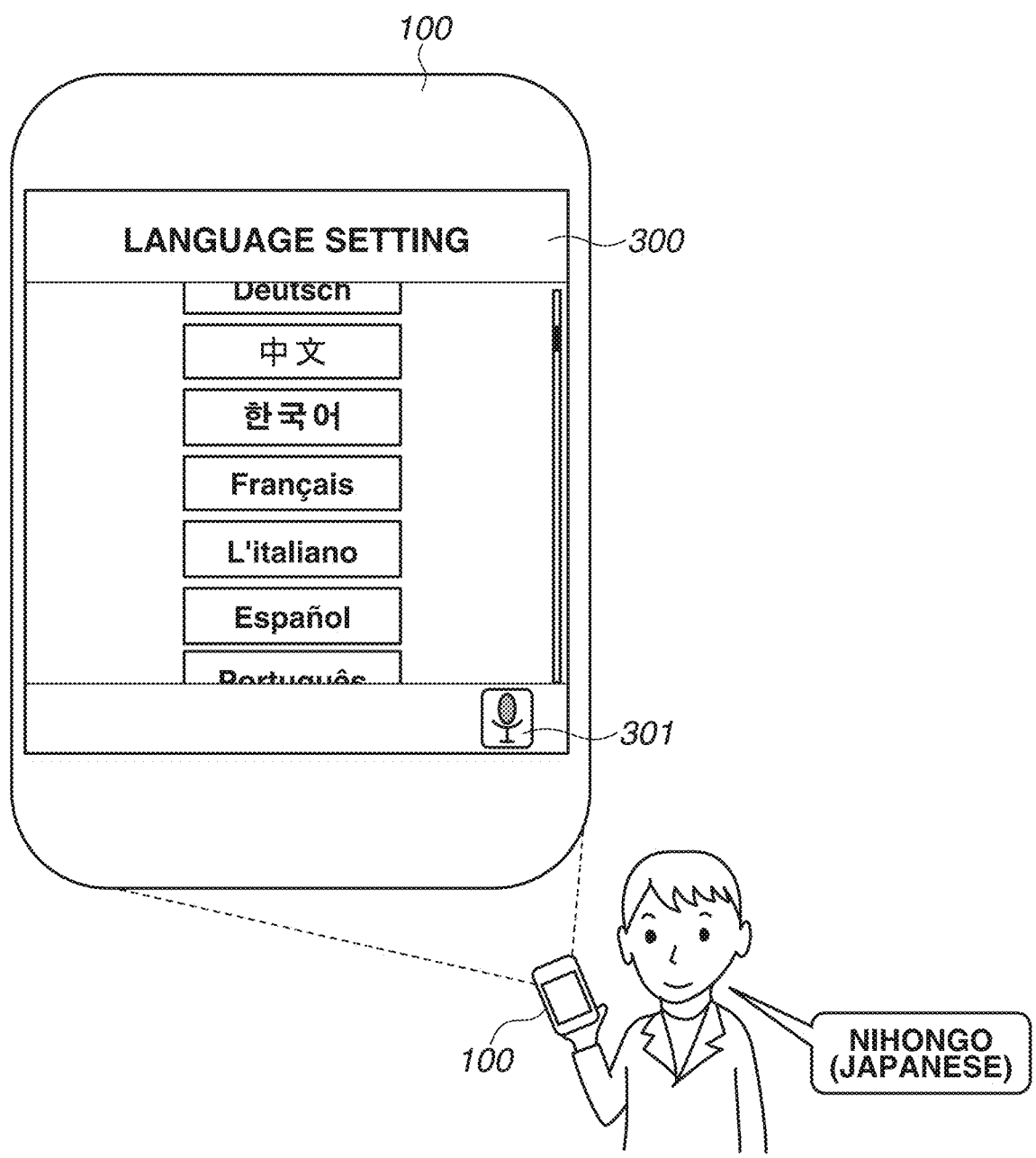
FIG. 3 illustrates one example of a method for changing a setting of a primary language on the smartphone according to the first exemplary embodiment.

FIG. 2 illustrates an outer appearance of the smartphone 100, which is the one example of the electronic apparatus. The smartphone 100 includes the display unit 106, the microphone 107, the speaker 108, and a voice input button 220. The voice input button 220 is an operation member included in the operation unit 105, and the user can input voice to the smartphone 100 by pressing the voice input button 220. Here, a trigger causing the smartphone 100 to receive a sound may be an operation performed by the user on a screen displayed on the display unit 106 instead of the operation of pressing the voice input button 220 by the user. For example, the voice input button 220 is a physical mechanism in FIG. 2, and a microphone button 301 illustrated in FIG. 3 is a graphical user interface (GUI) like an item operable via the touch panel. The user inputs voice to the smartphone 100 by operating the voice input button 220 or the microphone button 301.

The smartphone 100 can identify the language of the received voice. Here, two examples of a method by which the smartphone 100 identifies the language of the received voice will be described. First, in one of the two methods, the smartphone 100 converts the received voice into voice data to store it into the working memory 104, and identifies the language of this voice data with use of the program recorded in the nonvolatile memory 103. In the other method, the smartphone 100 transmits the received voice data to an externally located server via the communication unit 111. This externally located server analyzes the language of the received voice data, and transmits information regarding a result of the analysis to the smartphone 100. Then, according to this method, the smartphone 100 identifies the language of the voice by receiving the information via the communication unit 111. In the second method example, the information regarding the result of analyzing the voice contains at least one candidate for the language recognized by the external server as the language of the voice data. In the present exemplary embodiment, the second method example is employed.

FIG. 3 illustrates one example of a method for changing a setting of the primary language by voice according to the present exemplary embodiment. In FIG. 3, the user holding the smartphone 100 in hand has opened a screen 300 for changing the setting of the primary language on the smartphone 100. Here, the primary language on the smartphone 100 is English in an initial state. A drawing of the smartphone 100 illustrated on an upper left side of FIG. 3 is an enlarged view of the screen on the smartphone 100 held by the user. In this situation, the user changes the primary language on the smartphone 100 by speaking an arbitrary language name (a word meaning "Japanese" in the case of FIG. 3) while pressing the voice input button 220 or the microphone button 301. The smartphone 100 receives this language name, and displays a screen for confirming whether to change the primary language like an example illustrated in FIG. 4 in a case where the language has been identified with use of the above-described program for analyzing the language.

Figure 4:
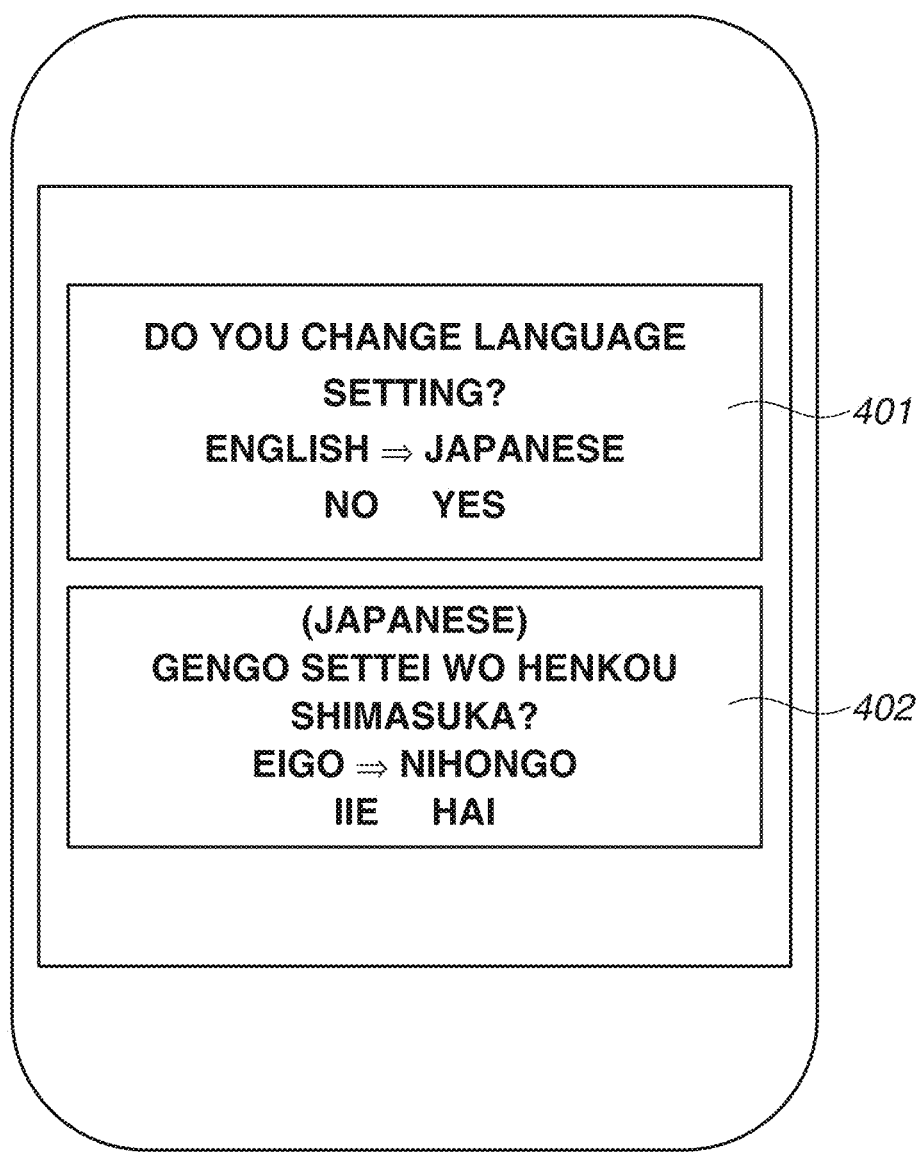
FIG. 4 illustrates one example of a screen of the smartphone to confirm whether to change the setting of the primary language according to the first exemplary embodiment.

In FIG. 4, the smartphone 100 displays the screen for confirming whether to change the primary language from the current primary language to the language of the received voice. The smartphone 100 displays a notification confirming whether to change the setting in the current primary language (English) in a dialog box 401, and, in parallel with that, displays a notification confirming whether to change the setting in the language (Japanese) of the received voice in a dialog box 402. These dialog boxes 401 and 402 are operation UIs to be operated by the user. The user may operate any dialog box. The user can set the primary language by operating the smartphone 100 with use of the operation unit 105 or voice. In the case where the user operates the smartphone 100 by voice, the smartphone 100 according to the present exemplary embodiment accepts an instruction regardless of whether the instruction is given in English or Japanese. The smartphone 100 allows the user to easily prevent the primary language from being changed to a language unintended by the user by notifying the user both in the primary language and the language of the received voice in this manner.

Figure 5:
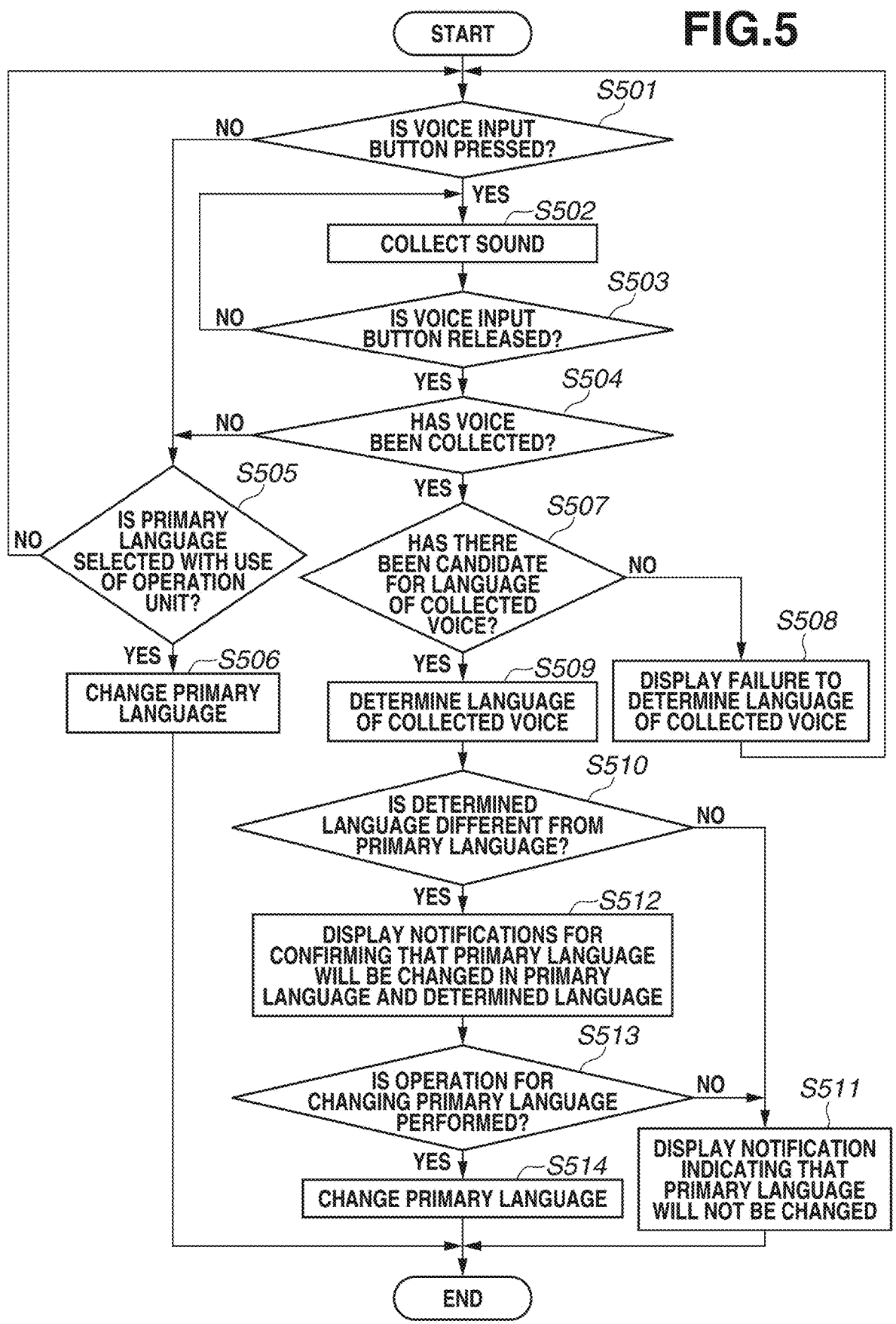
FIG. 5 is a flowchart illustrating one example of processing performed by the smartphone according to the first exemplary embodiment.

FIG. 5 is a flowchart illustrating one example of a processing procedure for changing the setting of the primary language on the smartphone 100. The software recorded in the nonvolatile memory 103 is developed into the working memory 104 and is executed by the control unit 101, by which this processing is realized. Further, when the control unit 101 displays, on the display unit 106, the screen for changing the setting of the primary language on the smartphone 100, the displayed screen triggers the processing to be started. For example, when the screen 300 illustrated in FIG. 3 is displayed, the control unit 101 starts the processing according to the present flowchart.

In step S501, the control unit 101 determines whether the voice input button 220 is pressed. If the control unit 101 determines that the voice input button 220 is pressed (YES in step S501), the processing proceeds to step S502. If the control unit 101 determines that the voice input button 220 is not pressed (NO in step S501), the processing proceeds to step S505.

In step S502, the control unit 101 receives a sound by the microphone 107.

In step S503, the control unit 101 determines whether the voice input button 220 is released. If the voice input button 220 is not released (NO in step S503), the processing returns to step S502, in which the control unit 101 continues receiving the sound. If the voice input button 220 is released (YES in step S503), the processing proceeds to step S504.

In step S504, the control unit 101 determines whether the voice has been received. For example, if voice louder than a threshold value has been received, the control unit 101 determines that the voice has been received. If the volume of the voice has been the threshold value or lower, the control unit 101 determines that the voice has not been received. First, how the processing continues when the control unit 101 has not received the voice will be described. In this case (NO in step S504), the processing proceeds to step S505.

In step S505, the control unit 101 determines whether a language displayed on the display unit 106 is selected by the user with use of the operation unit 105. If the control unit 101 determines that no language is selected with use of the operation unit 105 (NO in step S505), the processing returns to step S501. If the control unit 101 determines that a language is selected with use of the operation unit 105 (YES in step S505), the processing proceeds to step S506.

In step S506, the control unit 101 changes the setting in such a manner that the language selected in step S505 is set as the primary language on the smartphone 100, and ends the processing according to the present flowchart.

Next, how the processing continues when the control unit 101 has received the voice in step S504 will be described. In this case (YES in step S504), the processing proceeds to step S507.

In step S507, the control unit 101 determines whether there has been a language candidate appropriate for the language of the voice received in step S502. For example, the control unit 101 acquires the candidate for the language of the voice with use of the external server as described above. If there has been a language appropriate for the language of the received voice (YES in step S507), the processing proceeds to step 509. If there has been no language appropriate for the language of the received voice (NO in step S507), the processing proceeds to step S508.

In step S508, the control unit 101 displays, on the display unit 106, a notification indicating that there has been no language candidate appropriate for the language of the received voice in step S507. After the control unit 101 performs the present processing, the processing returns to step S501.

Meanwhile, in step S509, the control unit 101 selects one from the language candidate(s) determined in step S507.

In step S510, the control unit 101 determines whether the language selected in step S509 and the primary language match each other. If the two languages are different from each other (YES in step S510), the processing proceeds to step S512. If the two languages match each other (NO in step S510), the processing proceeds to step S511.

In step S511, the control unit 101 displays a notification indicating that the primary language will not be changed on the display unit 106 since the language of the received voice matches the primary language. Alternatively, the control unit 101 plays back a sound or voice indicating that the primary language will not be changed in the primary language using the speaker 108, and ends the processing according to the present flowchart.

On the other hand, in step S512, the control unit 101 displays, on the display unit 106, a notification confirming with the user that the primary language will be changed to the language of the received voice. At this time, the control unit 101 displays, on the screen displayed on the display unit 106, notifications indicating the same content both in the primary language and the language of the received voice. For example, in a case where the primary language is English and the received voice is "Japanese", the control unit 101 displays the notifications confirming whether to change the primary language in the dialog box 401 (indicated in English) and the dialog box 402 (indicated in Japanese) as illustrated in FIG. 4. In this manner, when the user changes the setting of the primary language, the control unit 101 allows the user to confirm a plurality of languages and to determine whether to change the language from the primary language to the language of the received voice by presenting the display in the primary language and the language of the received voice. This allows the user to easily prevent the smartphone 100 from changing the setting of the primary language to a language unintended by the user.

In step S513, the control unit 101 determines whether the change in the setting of the primary language is approved by the user. For example, in FIG. 4, the control unit 101 determines whether "YES" is touched (i.e., an operation for changing the primary language is performed) or "NO" is touched (i.e., an operation for not changing the primary language is performed) on the dialog box 401. Further, for example, in FIG. 4, the control unit 101 determines whether "HAI (YES in Japanese)" is touched (i.e., the operation for changing the primary language is performed) or "IIE (NO in Japanese)" is touched (i.e., the operation for not changing the primary language is performed) on the dialog box 402. If the operation for changing the primary language is performed (YES in step S513), the processing proceeds to step S514. If the operation for not changing the primary language is performed (NO in step S513), the processing proceeds to step S511.

In step S514, the control unit 101 changes the setting of the primary language to the language of the received voice. After that, the control unit 101 ends the processing according to the present flowchart.

In this manner, the present exemplary embodiment has been described focusing on the processing in which the control unit 101 changes the primary language when the control unit 101 displays the screen for changing the setting of the primary language. By this processing, the smartphone 100 can allow the user to easily change the setting of the language on the electronic apparatus to the language intended by the user.

Figure 6:
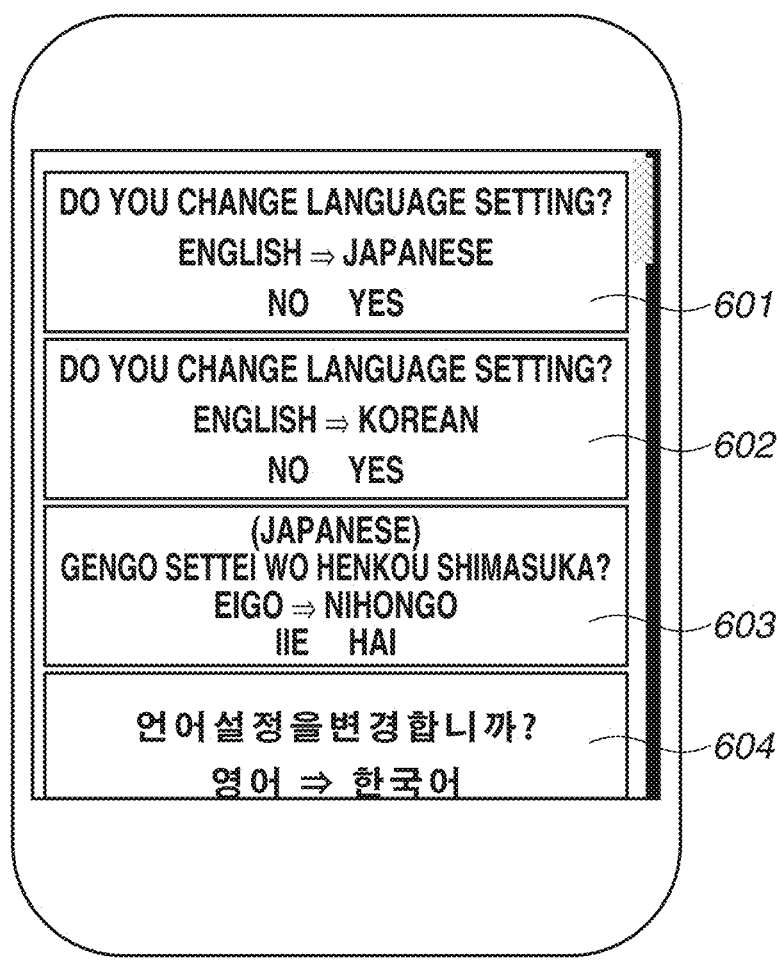
FIG. 6 illustrates one example of a screen of the smartphone to select the primary language from a plurality of language candidates according to the first exemplary embodiment.

Further, if the control unit 101 determines that there is a plurality of candidates for the language of the received voice in step S509, in step S512, the control unit 101 displays dialog boxes in the primary language and the plurality of candidates. For example, if it is determined that the primary language is English and the received voice is Japanese or Korean, the control unit 101 displays a dialog box 601, a dialog box 602, a dialog box 603, and a dialog box 604 as illustrated in FIG. 6. Now, the candidates for the received voice have been described as Japanese and Korean by way of example for the purpose of illustration, but this does not mean that pronunciations of Japanese words and Korean words sound alike. The control unit 101 displays, in English (the primary language), whether to change the language from English to Japanese (the candidate for the language of the received voice) and whether to change the language from English to Korean (the candidate for the language of the received voice) in the dialog box 601 and the dialog box 602, respectively. The control unit 101 displays, in Japanese and Korean (the candidates for the language of the received voice), whether to change the language from English to Japanese (the candidate for the language of the received voice) and whether to change the language from English to Korean (the candidate for the language of the received voice) in the dialog box 603 and the dialog box 604, respectively. If not all of the dialog boxes 601 to 604 cannot be contained within the screen, the control unit 101 displays the dialog boxes 601 to 604 on the display unit 106 while allowing the screen to be scrolled with use of the operation unit 105 as illustrated in FIG. 6.

Figure 7:
FIG. 7 illustrates one example of a method by which the smartphone confirms with a user by voice in a case of confirming with the user whether to change the setting of the primary language.

Further, in step S512, the control unit 101 may play back a sound or voice containing a content for confirming with the user whether to change the language from the primary language to the language of the received voice, using the speaker 108. For example, if it is determined that the primary language is English and the received voice is Japanese, the control unit 101 plays back a sound or voice containing a content for confirming with the user that the primary language will be changed from English to Japanese in English and Japanese. In this case, the speaker 108 sequentially plays back the sound or voice in each of the languages, as illustrated in FIG. 7. The user listens to the sound or voice and then operates the smartphone 100 by the operation unit 105 or voice, thereby determining whether to change the primary language.

Further, in step S513, the user may operate the smartphone 100 by voice in determining whether to change the primary language. The smartphone 100 according to the present exemplary embodiment accepts the instruction issued either in English or Japanese. In this case, the control unit 101 receives the user's voice by the microphone 107, and performs the processing so as to enable the user to determine whether to change the language both in the primary language before the change or the language of the received voice.

Further, in step S504, the control unit 101 can determine whether the received sound is voice by analyzing a temporal change in the volume of the received sound. For example, the control unit 101 records a feature amount of the temporal change in the volume of the voice into the nonvolatile memory 103 in advance, and determines whether the received sound is voice by comparing the received sound with this feature amount.

Next, a second exemplary embodiment will be described. The second exemplary embodiment will be described as processing in which the control unit 101 changes the primary language with use of a voice recognition function. The voice recognition function refers to a function allowing the electronic apparatus to perform processing based on a meaning of the received voice. For example, a smart speaker has the voice recognition function that enables the smart speaker to, upon receiving the user's voice meaning, for example, "turn on the television" or "play favorite music", power on the television or play back a song that has been highly frequently played back according to the meaning of the received voice via wireless communication. In the second exemplary embodiment, the smartphone 100 is assumed to be able to change the setting of the primary language with use of the voice recognition function.

Figure 8:
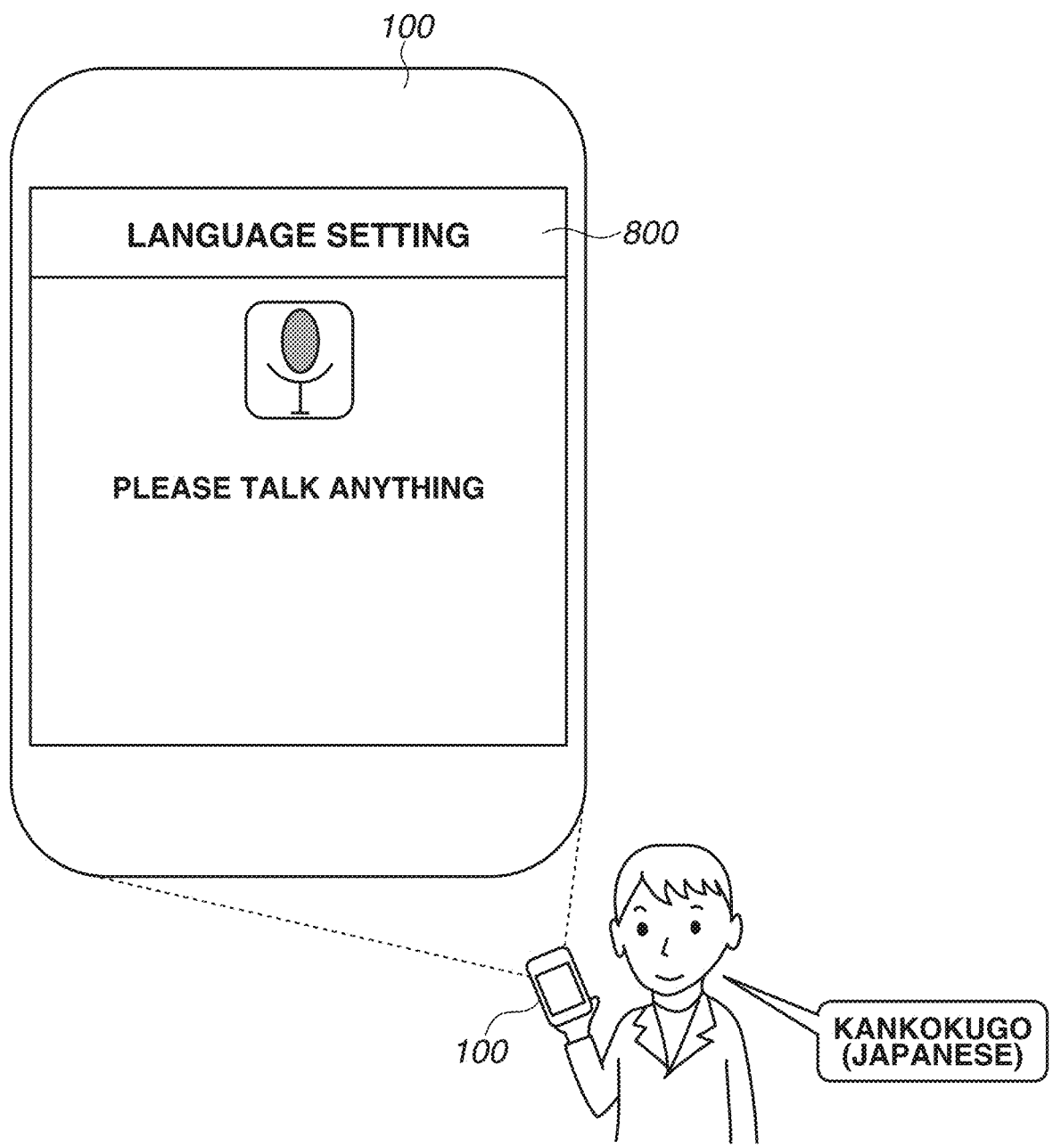
FIG. 8 illustrates one example of a method for changing the setting of the primary language on the smartphone according to a second exemplary embodiment.

FIG. 8 illustrates one example of a method for changing the setting of the primary language with use of the voice recognition function according to the present exemplary embodiment. In FIG. 8, the user holding the smartphone 100 in hand has opened a screen 800 for changing the setting of the primary language with use of the voice recognition function. Here, the primary language on the smartphone 100 is English in the initial state. A drawing of the smartphone 100 illustrated on an upper left side of FIG. 8 is an enlarged view of the screen on the smartphone 100 held by the user. In this situation, the user changes the primary language on the smartphone 100 by uttering an arbitrary language name ("kankokugo," a Japanese word meaning Korean, in the case of FIG. 8). In FIG. 8, the smartphone 100 can determine that Korean is one candidate based on the meaning of the word uttered by the user. Further, the smartphone 100 can determine that Japanese is also another candidate since the Japanese word, "kankokugo," has been received. The smartphone 100 receives the language name uttered by the user, and displays a screen for confirming whether to change the primary language like an example illustrated in FIG. 9 if succeeding in determining the language with use of the voice recognition function.

Figure 9:
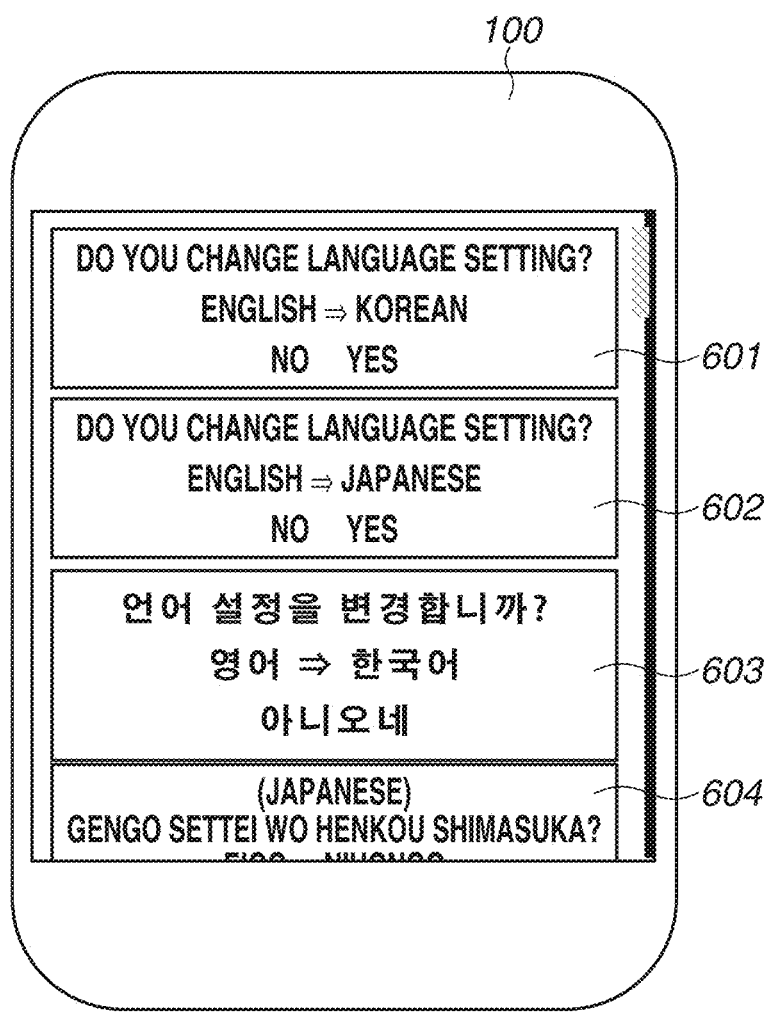
FIG. 9 illustrates one example of a screen of the smartphone to confirm whether to change the setting of the primary language according to the second exemplary embodiment.

In FIG. 9, the smartphone 100 displays the screen for confirming whether to change the primary language from the current primary language to the received language. The screen illustrated in FIG. 9 has a similar function to the screen illustrated in FIG. 6. However, the screen illustrated in FIG. 9 is different from the screen illustrated in FIG. 6 in terms of an order in which the dialog boxes are arranged. In FIG. 8, it is considered that the user has an intention to change the primary language to Korean based on the meaning of the uttered word. However, it is also considered that the user may want to change the primary language on the smartphone 100 to Japanese since the user has said the word in Japanese. In FIG. 9, thus, the smartphone 100 displays Korean on a higher position of the screen than Japanese. When there is the plurality of candidates for the language to be set as the primary language in this manner, the smartphone 100 sets priority levels to these candidates for the language, and displays the dialog boxes in descending order of priority level. The smartphone 100 displays the meaning of the word recognized by the voice recognition function in preference to the language of the word itself in the present exemplary embodiment, but this priority order may be reversed. Further, if it is unable to recognize the meaning of the word uttered by the user but able to determine that there is a plurality of candidates for the language of this word itself, the smartphone 100 displays the plurality of candidates in the order of priority. For example, if it is determined that the language is more likely to be Japanese than Korean, the smartphone 100 sets a higher priority level to Japanese than the priority level of Korean.

Figure 10:
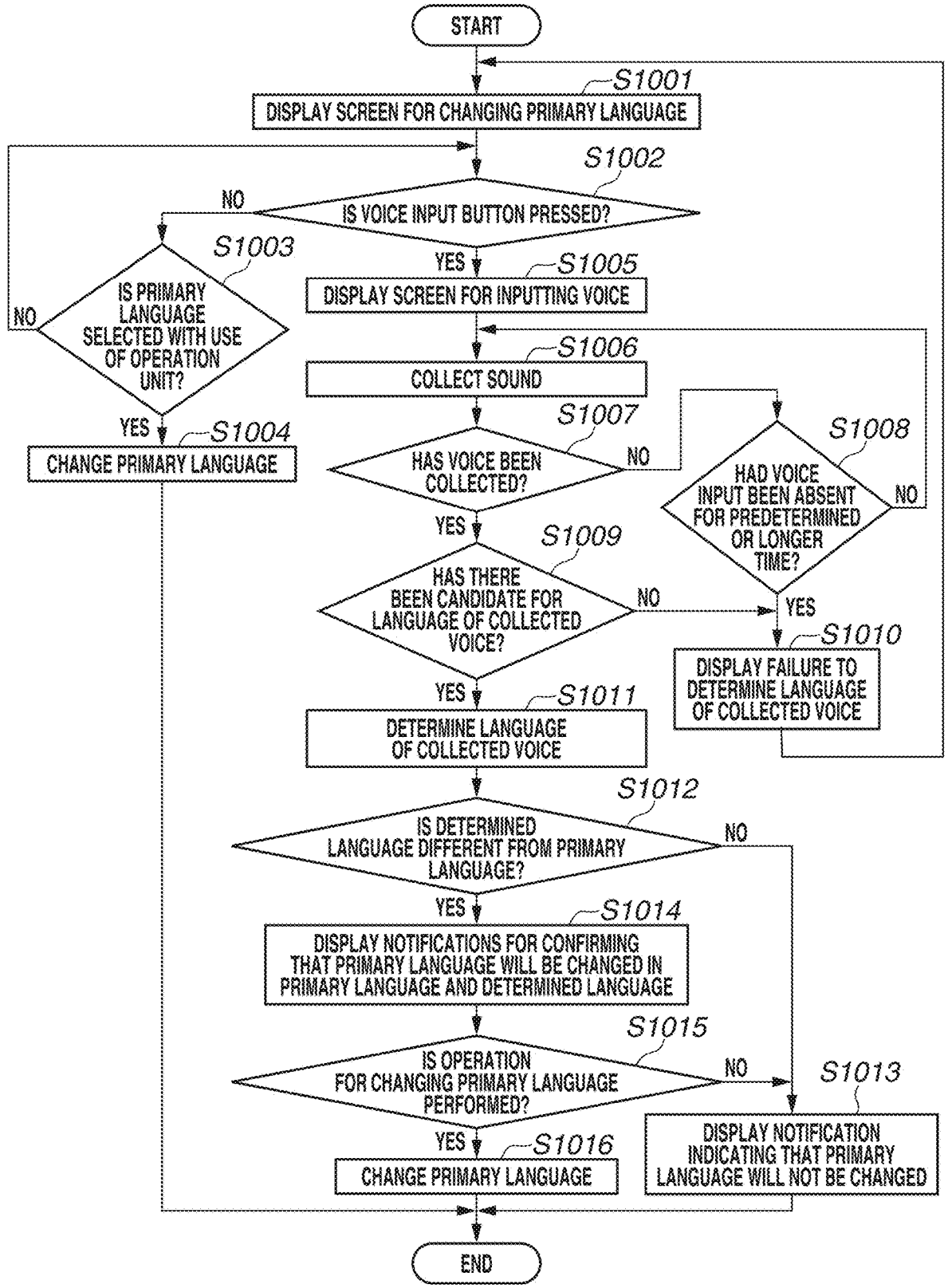
FIG. 10 is a flowchart illustrating one example of processing performed by the smartphone according to the second exemplary embodiment.

FIG. 10 is a flowchart illustrating a processing procedure for changing the setting of the primary language on the smartphone 100. The software recorded in the nonvolatile memory 103 is developed into the working memory 104 and is executed by the control unit 101, by which this processing is realized. Further, when the power button of the operation unit 105 is turned on, the processing is started by the operation as a trigger.

In step S1001, the control unit 101 displays, on the display unit 106, the screen for changing the setting of the primary language on the smartphone 100. For example, the screen for changing the setting of the primary language is a screen used for the user to select an arbitrary language from among languages available on the smartphone 100 as indicated by the screen 300 illustrated in FIG. 3. For example, in a case where the user powers on the smartphone 100 for the first time or in a case where the user powers on the smartphone 100 according to a predetermined operation procedure, the turning on of the power button serves as a trigger to cause the control unit 101 to display the screen for changing the setting of the primary language.

In step S1002, the control unit 101 determines whether the voice input button 220 is pressed. If the control unit 101 determines that the voice input button 220 is pressed (YES in step S1002), the processing proceeds to step S1005. If the control unit 101 determines that the voice input button 220 is not pressed (NO in step S1002), the processing proceeds to step S1003.

Processes in step S1003 and step S1004 are similar to those in step S505 and step S506 illustrate in FIG. 5, respectively.

In step S1005, the control unit 101 displays a screen for receiving voice by the voice recognition function on the display unit 106. Further, the screen in the present step corresponds to the screen 800 illustrated in FIG. 8.

A process in step S1006 is similar to that in step S502 illustrated in FIG. 5.

In step S1007, the control unit 101 determines whether voice has been received. Even when a predetermined time has not passed, the control unit 101 determines that voice has been received if voice having a volume greater than the threshold value has been received in step S1006. If the volume of the voice has been the threshold value or less, the control unit 101 determines that the voice has not been received.

In step S1008, the control unit 101 determines whether the predetermined or longer time has passed since the start of the receiving of voice. If the time that has passed since the start of the receiving of voice is shorter than the predetermined time (NO in step S1008), the processing returns to step S1006. If the predetermined or longer time has passed since the start of the receiving of the voice (YES in step S1008), the processing proceeds to step S1010.

Step S1009 to step S1016 are similar to step S507 to step S514 illustrate in FIG. 5, respectively.

In this manner, the present exemplary embodiment has been described focusing on the processing in which the control unit 101 changes the primary language with use of the voice recognition function.

Figure 11:
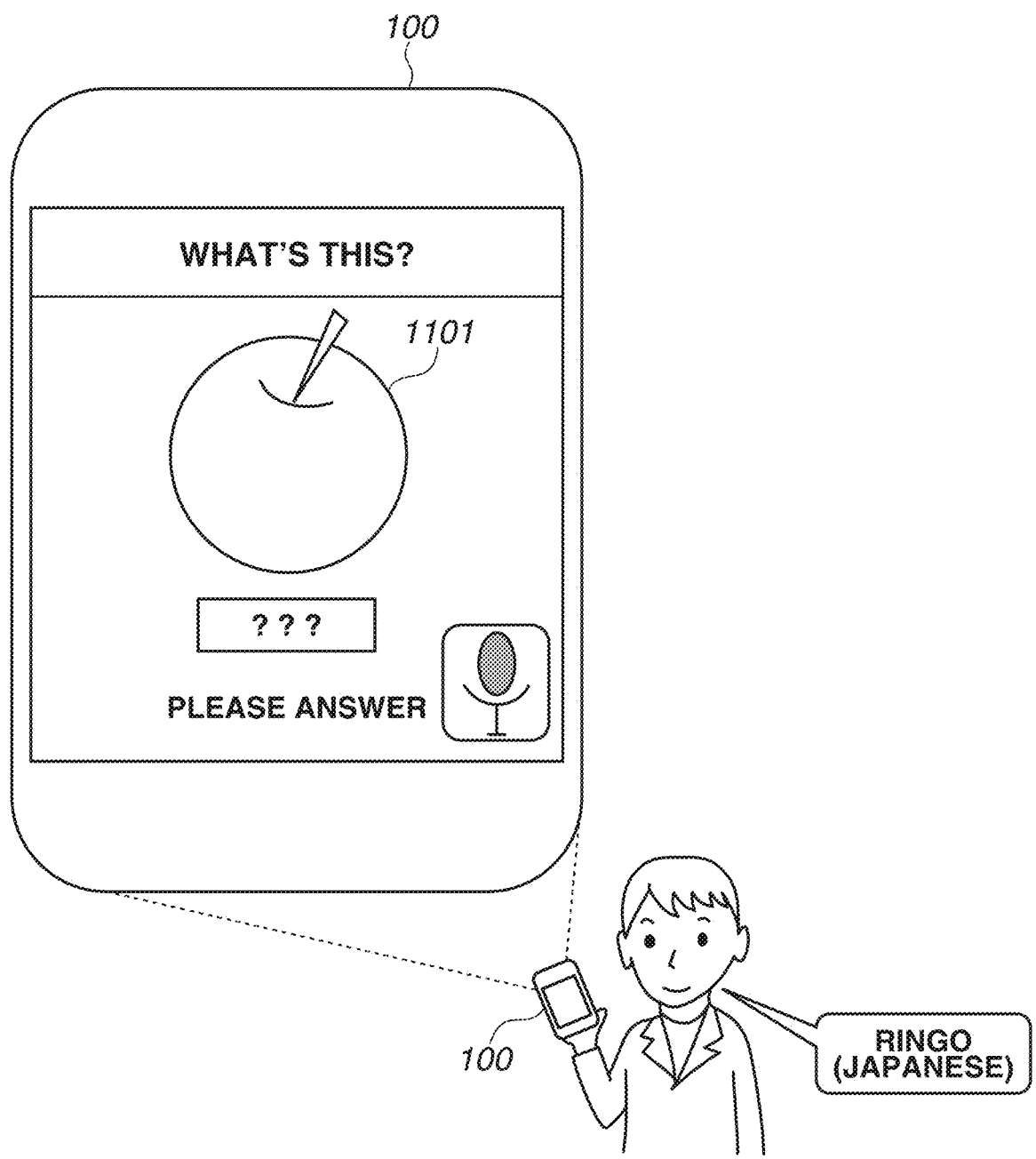
FIG. 11 illustrates one example of a method by which the smartphone receives the user's voice with use of an image.

Although the user changes the setting of the primary language by uttering the language name to the smartphone 100 in the present exemplary embodiment, the user can change the setting of the primary language with use of an arbitrary word in a case where the voice recognition function can determine the language from an arbitrary voice. Further, the control unit 101 may receive a word uttered about a specific image instead of the language name. For example, referring to FIG. 11, the control unit 101 displays an image 1101 of an apple on the display unit 106. The control unit 101 determines what is uttered by the user with respect to the image 1101 of an apple. If a Japanese word meaning an apple, "ringo," is received, the control unit 101 can determine that the word uttered by the user is Japanese. In another case, if an English word, "apple," is received, the control unit 101 can determine that the word uttered by the user is English.

The present disclosure can also be realized by processing that supplies a program capable of achieving one or more functions of the above-described exemplary embodiments to a system or an apparatus via a network or a storage medium, and causes one or more processors in a computer of this system or apparatus to read out and execute the program. Further, the present disclosure can also be realized by a circuit (for example, an application specific integrated circuit (ASIC)) capable of achieving one or more functions.

The present disclosure is not limited to the above-described exemplary embodiments as they are, and can be embodied with a component modified within a range that does not depart from the spirit of the present disclosure when being implemented actually. Further, various inventions can be made by an arbitrary combination of a plurality of components disclosed in the above-described exemplary embodiments. For example, several components may be omitted from all the components indicated in the exemplary embodiments. Further, the components may be arbitrarily combined across different exemplary embodiments.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-171938, filed Sep. 13, 2018, which is hereby incorporated by reference herein in its entirety.

What is claimed is:

1. An electronic apparatus comprising:
a voice receiving unit;
a display unit;
an operation unit; and
a control unit,
    wherein the control unit is configured to perform control so as to identify a language of a voice input received by the voice receiving unit in a case where a screen for changing a setting of a primary language, which is set as a language used by a user on the electronic apparatus, is displayed,
    wherein, in a case where it is determined that the identified language, which is a first language, is different from a second language set as the primary language, the control unit is configured to display on the display unit, in both the first language and the second language, a message for confirming whether to change the primary language from the second language to the first language, and
    wherein, in a case where the user demands by operating the operation unit that the primary language be changed from the second language to the first language, the control unit changes the primary language from the second language to the first language.

2. The electronic apparatus according to claim 1,
wherein the control unit is configured to display, on the display unit, an operation user interface (UI) corresponding to the message in both the first language and the second language, and
wherein the operation UI is an interface for changing a language setting.

3. The electronic apparatus according to claim 1, wherein, in a case where it is determined that a content of the received voice input contains a third language different from both the first language and the second language, the control unit is configured to display, in both the third language and the second language, a message for confirming whether to change the language from the second language to the third language.

4. The electronic apparatus according to claim 1, wherein, in a case where it is determined that there is a plurality of candidates for the first language, the control unit is configured to display on the display unit, in the second language set as a primary language in the electronic apparatus, messages for confirming whether to change the primary language from the second language to any one of the respective languages as the plurality of candidates.

5. The electronic apparatus according to claim 1, wherein, in a case where it is determined that there is a plurality of candidates for the first language, the control unit is configured to display on the display unit, in a fourth language that is one of the languages from the plurality of candidates, a message for confirming whether to change the primary language from the second language to the fourth language.

6. The electronic apparatus according to claim 1, wherein, in a case where it is determined that the first language and the second language match each other, the control unit is configured to issue a notification indicating that the primary language is not changed.

7. The electronic apparatus according to claim 1, further comprising a communication unit,
wherein the control unit is configured to identify the language of the voice input received by the voice receiving unit by converting the voice input into voice data, transmitting the voice data to an external apparatus via the communication unit, and receiving information as a result of analyzing the voice data from the external apparatus via the communication unit.

8. The electronic apparatus according to claim 1,
wherein, in a case where the message for confirming whether to change the setting of the primary language is displayed on the display unit, the control unit is configured to cause the voice receiving unit to receive an instruction spoken by a user for changing the primary language, and
wherein, in a case where the instruction for changing the primary language is received from the user by voice, the control unit is configured to change the setting of the primary language.

9. A method for controlling an electronic apparatus that includes a voice receiving unit, an operation unit, and a display unit, the method comprising:
performing control so as to identify the language of a voice input received by the voice receiving unit in a case where a screen for changing a setting of a primary language, which is set as a language used by a user on the electronic apparatus, is displayed; and
in a case where it is determined that the identified language, which is a first language, is different from a second language set as the primary language, displaying on the display unit, in both the first language and the second language, a message for confirming whether to change the primary language from the second language to the first language, and
changing the primary language from the second language to the first language in a case where the user demands by operating the operation unit that the primary language be changed from the second language to the first language.

10. A non-transitory computer readable storage medium for storing a computer-readable program for causing an electronic apparatus including a voice receiving unit, an operation unit, and a display unit to execute a control method, the control method comprising:
performing control so as to identify the language of a voice input received by the voice receiving unit in a case where a screen for changing a setting of a primary language, which is set as a language used by a user on the electronic apparatus, is displayed; and
in a case where it is determined that the identified language, which is a first language, is different from a second language set as the primary language, displaying on the display unit, in both the first language and the second language, a message for confirming whether to change the primary language from the second language to the first language, and
changing the primary language from the second language to the first language in a case where the user demands by operating the operation unit that the primary language be changed from the second language to the first language.

11. An electronic apparatus comprising:
a voice receiving unit;
a notification unit;
an operation unit; and
a control unit,
wherein the control unit is configured to perform control so as to identify the language of the voice input received by the voice receiving unit in a case where a screen for changing a setting of a primary language, which is set as a language used by a user on the electronic apparatus, is displayed,
wherein, in a case where it is determined that the identified language, which is a first language, is different from a second language set as the primary language, the control unit is configured to indicate, in both the first language and the second language, a message by the notification unit, for confirming whether to change a primary language from the second language to the first language, and
wherein, in a case where the user demands by operating the operation unit that the primary language be changed from the second language to the first language, the control unit changes the primary language from the second language to the first language.

12. The electronic apparatus according to claim 2, wherein the control unit controls the display unit to display, in both the first language and the second language, a selection item indicating whether or not to change the language setting as the operation UI.

13. The electronic apparatus according to claim 4, wherein the content of the received voice input is a word meaning the third language.

14. The electronic apparatus according to claim 4, wherein the content of the received voice input is a word uttered about a specific image displayed on the display unit.

15. The electronic apparatus according to claim 1, further comprising a voice output unit,
wherein, in a case where it is determined that the identified language, which is the first language, is different from the second language, the control unit outputs, in both the first language and the second language, a message for confirming whether to change the primary language from the second language to the first language by the voice output unit.

16. The electronic apparatus according to claim 1, wherein the control unit is configured to display a message in the primary language for confirming whether to change the primary language from the second language to the first language in preference to a message in the other languages for confirming whether to change the primary language from the second language.

* * * * *